United States Patent [19]

Ersoy

[11] 4,293,183
[45] Oct. 6, 1981

[54] METHOD OF HOLOGRAPHIC RECORDING AND RECONSTRUCTION OF SPATIAL WAVES

[75] Inventor: Okan K. Ersoy, Li, Norway

[73] Assignee: Sentralinstitutt for Industriell Forskning, Oslo, Norway

[21] Appl. No.: 19,188

[22] Filed: Mar. 9, 1979

[30] Foreign Application Priority Data

Mar. 9, 1978 [NO] Norway ................................ 780833

[51] Int. Cl.³ ............................................. G03H 1/28
[52] U.S. Cl. ................................................. 350/3.77
[58] Field of Search ............. 350/3.73, 3.75, 3.77–3.79

[56] References Cited

U.S. PATENT DOCUMENTS

| | | | |
|---|---|---|---|
| 3,542,449 | 11/1970 | Van Ligten | 350/3.77 |
| 3,639,029 | 2/1972 | Haines | 350/3.83 |
| 3,639,033 | 2/1972 | Haines | 350/3.69 |
| 3,813,139 | 5/1974 | Carlsen | 350/3.84 |

*Primary Examiner*—John K. Corbin
*Assistant Examiner*—Bruce Y. Arnold
*Attorney, Agent, or Firm*—Wenderoth, Lind & Ponack

[57] ABSTRACT

This invention concerns a method for the production of a hologram of at least one object wave and reconstruction of the same by means of a spherical reference/-reconstruction wave, whose focal point is located at a short distance from the hologram. This distance is located during the construction and the reconstruction process, such that only one reconstructed image is generated in a given position whereas the other images are simultaneously defocused. The distance is determined on the basis of the signal to noise ratio desired at the object position and geometrical dimensions which per se are known to cause defocusing, such as hologram size, distance between the hologram and the object, and the area of hologram apertures. Thus, one of the images of different order of one object wavefront or only one of a number of wavefronts encoded on the same halogram can be reconstructed by simply adjusting the distance.

3 Claims, 10 Drawing Figures

METHOD OF HOLOGRAPHIC RECORDING AND RECONSTRUCTION OF SPATIAL WAVES

BACKGROUND OF THE INVENTION

The fundamental problem in holography is to record an object wavefront and then reconstruct the same physically. The basic solution of this problem has been given by D. Gabor (Nature 161 (1948) 777), and involves mixing the object wave $U_o(x,y)$ with an on-axis reference wave $U_r(x,y)$ in a recording device whose transfer function is proportional to the total intensity $I(x,y)$:

$$I(x,y) = |U_r + U_o|^2 = |U_r|^2 + |U_o|^2 + U_r^* U_o + U_r U_o^* \quad (1)$$

The recording device forms the hologram of the object wave. By illuminating the hologram with an on-axis reconstruction wave $U_s(x,y)$, the object wave is reconstructed. The total wave obtained from the hologram is proportional to $U(x,y)$:

$$U(x,y) = U_s|U_r|^2 + U_s|U_o|^2 + U_r U_s U_o^* + U_r^* U_s U_o \quad (2)$$

or:

$$U(x,y) = U_r|U_r|^2 + U_r|U_o|^2 + U_r^2 U_o^* + |U_r|^2 U_o \quad (3)$$

when $U_s(x,y) = U_r(x,y)$, according to Gabor.

The two last terms of equation (2) represent one virtual and one real image of the object, or both represent two virtual or two real images, depending upon the reference and reconstruction waves (R. W. Meier, J., Opt. Soc. Am. 56 (1966) 219). The corresponding terms in equation (3) result in one virtual image and one real image which overlap each other. The problem of overlapping images was solved by E. N. Leith and J. Upatnieks (J. Opt. Soc. Am. 52 (1962) 1123) who introduced off-axis reference and reconstruction waves:

$$U_r = U_s = Ae^{jk(\alpha x + \beta y + \gamma z)} \quad (4)$$

where
 a = the amplitude,
 $k = 2\pi/\lambda$ with $\lambda$ = wavelength, and
 $\alpha, \beta, \gamma$ are the direction cosines.

This expression included in equation (2) or (3) shows that all reconstructed images are separated from each other in space.

If the hologram is recorded as a linear volume hologram, then a single image can be obtained. However, the generation of volume holograms is much more difficult than plane holograms.

The same results are obtained in digital holography when the analog holographic technique is copied. As is known, the principle of digital holography concerns sampling of the object wavefront, calculation of the corresponding hologram points and registration of these in a medium which is to form the hologram. By illuminating the hologram with the reconstruction wave the wavefront is reconstructed physically as virtual, real and higher order images. It is also possible to calculate the reconstructed wavefront in the computer and to display the result in a display unit.

Since digital holography is not limited to the use of physical waves during the production of the hologram, it has been shown possible to produce holograms that yield reconstruction of only one image. In the kineform method (L. B. Lesem, P. M. Hirsch, J. A. Jordan, Jr., IBM J. res. Develop. 13 (1969) 150) where the reconstructed wave emanating from the hologram is described as $$U(x,y) = A(x,y,z)e^{j\phi(x,y,z)} \quad (5)$$

it is assumed that the information comes mainly from the phase $\phi(x,y,z)$, and the amplitude $A(x,y,z)$ is taken to be constant. The calculated phase is quantized into a certain number of grey levels which are then produced as hologram points on a photographic film. However, the method represents a rather tedious process. Another solution described by D. C. Chu, J. R. Fienup and J. W. Goodman (Appl. Opt. 12 (1973) 1386) concerns the use of two photographic emulsions for separate control of amplitude and phase. However, it is difficult to align the two emulsions. In most other methods both the real and virtual images are reproduced, as well as higher order images whenever the transfer function of the hologram is nonlinear. There has consequently existed a need for a simple holographic method that results in a more satisfactory reconstruction of the object wave.

It is also desirable to be able to reconstruct only the image of one object at a time when a number of wavefronts of different objects are recorded in the same hologram and to be able to scan from one image to another in a simple fashion.

SUMMARY OF THE INVENTION

The object of the present invention is to bring about a general and simple solution to the problems hereby mentioned.

With a plane on-axis reconstruction wave, it is observed that the virtual and real images are symmetrically located at each side of the hologram plane. Assuming the object wave is a sum of spherical waves coming from individual object points, the virtual and real object points which are symmetrical mirror images of each other correspond to object waves on the hologram with the same amplitude and opposite phase. Thus, it may be possible to reconstruct only one image if the symmetry is destroyed. However, choosing another simple geometry such as an off-axis plane wave as done by Leith and Upatnieks only distorts the symmetry and results in images that are at different positions than before.

The method according to the present invention is an alternative to the technique of Leith and Upatnieks, and it is characterized in that the point source of the spherical reference/reconstruction wave is located at a short distance from the hologram, and that the distance is adjusted during the reconstruction process, whereby only one reconstructed image is focused with the source in a given position while the other images are simultaneously defocused, such distance being determined on the basis of the desired signal to noise ratio at the image, geometrical dimensions which per se are known to cause defocusing, such as hologram size, distance between the hologram and the object, and the area of hologram points.

Reconstruction of only one visible or detectable image involves a series of advantages, both when different objects are to be reconstructed from the same hologram and when only one order of an image is desired. Hereby it is mentioned in brief, that due to the small hologram points which are used in digital holography, the volume in space where the image can be designed to be, is diffraction limited. If there is only one reconstructed image, this volume can be made much larger. Further, it is easy to filter out the reconstruction wave or use it to copy the hologram in the usual way. The position of the reconstructed image and its size are very much sensitive to variations of the focal point position of the reconstruction wave. Thus the image can easily be enlarged or reduced in size. Different images can be scanned on to the same area or volume of detection by changing the position of the focal point.

BRIEF DESCRIPTION OF THE DRAWINGS

The invention will now be described further by means of practical examples concerning optical digital holography, with reference to the accompanying drawings and photographic illustrations of diverse reconstructions, wherein.

DETAILED DESCRIPTION OF THE INVENTION

Figure 1:
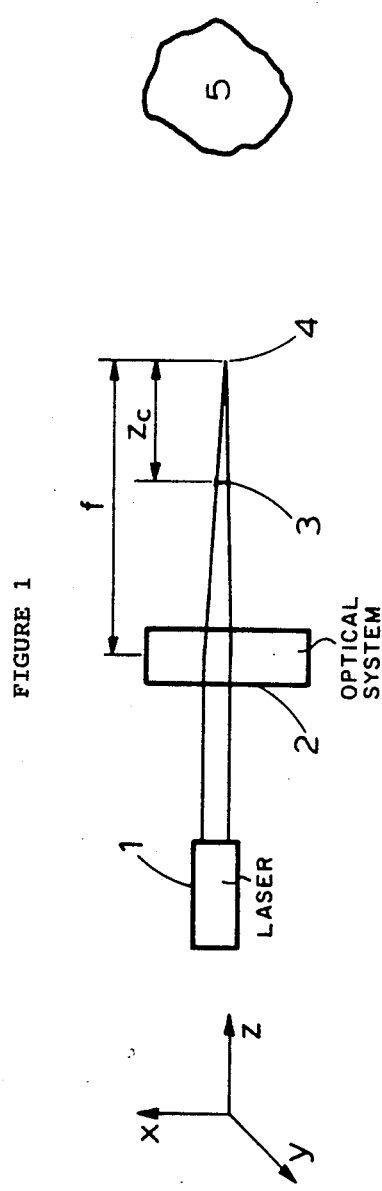
FIG. 1 is a sketch showing a system to be used with the present method.

In FIG. 1 the numeral 1 denotes a laser, 2 is an optical system, 3 is a hologram, 4 a small stop at the focal point of the optical system, and 5 is a reconstructed real image of an object. The focal length is denoted with f, and the distance between the hologram and the focal point is denoted with $z_c$. The coordinate directions are indicated at the left. The holograms were produced by means of a scanning electron microscope system as described in U.S. Pat. No. 4,109,996. All holograms had a size of 2×2 mm, and the diameter of the hologram apertures were of the order of 1 $\mu$m.

Figure 2:
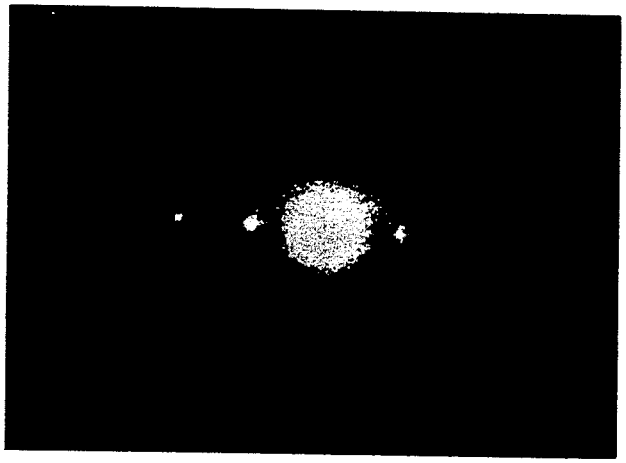
FIG. 2 illustrates a result according to known techniques when an on-axis plane reference/reconstruction wave is used.

In FIG. 2, reconstruction of an object point is shown. Digital production of the hologram as well as reconstruction of the object point were performed according to known principles by means of an on-axis plane reference and reconstruction wave. In the central region of the picture the image of the reconstruction wave is dominating. To the right of the reconstruction wave a somewhat overexposed real image of the object point can be seen, as well as images of higher order. The virtual image and higher order images can be seen to the left of the reconstruction wave.

Figure 3:
FIGS. 3-5 illustrate results obtained with the present method.

FIG. 3 shows the reconstruction obtained with a hologram that was produced digitally by means of the method according to the invention. The object is a point in this case as well, with the spherical reference wave having its origin at a point source 5 cm to the left of the hologram plane. The reconstruction was performed by means of the system shown in FIG. 1 without the stop. The x- and y-coordinates of the focal point were chosen the same as the coordinates of the midpoint of the hologram. The dark square seen is the enlarged picture of the hologram. This picture shows that only one of the object images was reconstructed visibly in this arrangement, while a great many different order images could be focused on the same plane, one at a time, when the focal point was moved a little in the z-direction. It was ascertained that when one image became focused, the other images were invisible on the same plane.

Figure 4:
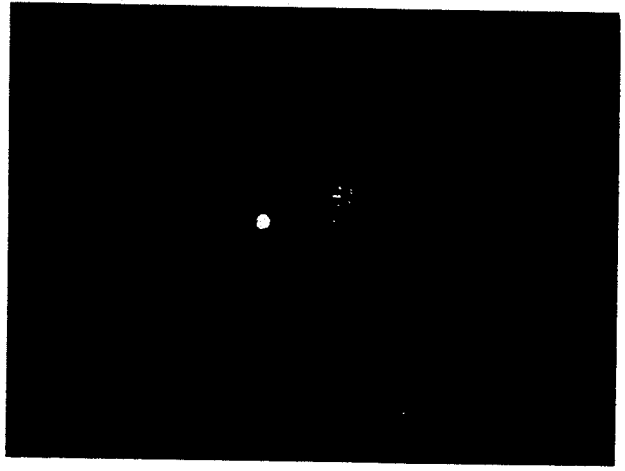

FIG. 4 shows the same results as in FIG. 3, but during the reconstruction process the reconstruction wave and zero-order wave were filtered out by means of the stop 4. The reconstructed image appears clearly without noise.

Figure 5:
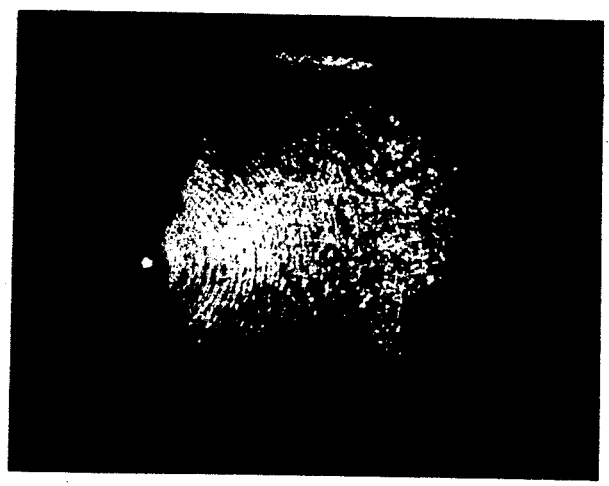

FIG. 5 shows the reconstruction obtained from another hologram where the distance between the hologram and the focal point was chosen to be 3 cm. In addition to showing one image of the object point, the picture shows circular fringes which are caused by interference between the reconstruction wave and the object wave. By adjusting the focal point many images of higher order were focused, one by one, on the same plane, but the total number that could be focused was less than in connection with FIG. 3. When the distance between the hologram and the focal point was chosen to be 1 cm with another hologram, the number of higher order images that could be focused on the same plane decreased further.

Figure 6:
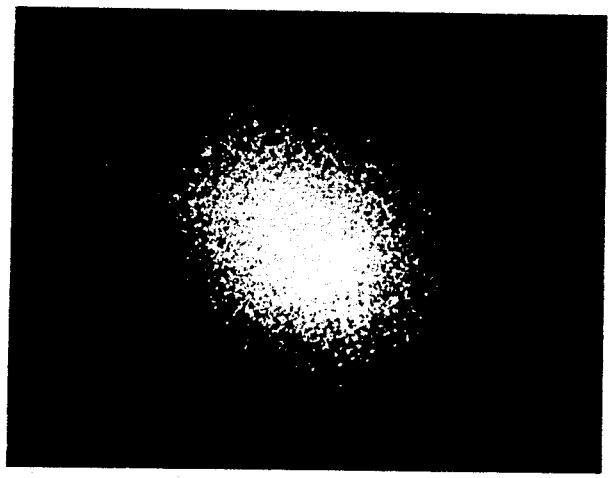
FIGS. 6-7 show results after reconstruction with an on-axis plane wave.

Concerning FIG. 6, the hologram with 1 cm focal distance was used, but the reconstruction was performed with a plane wave. No signs of any object point images exist.

Figure 7:
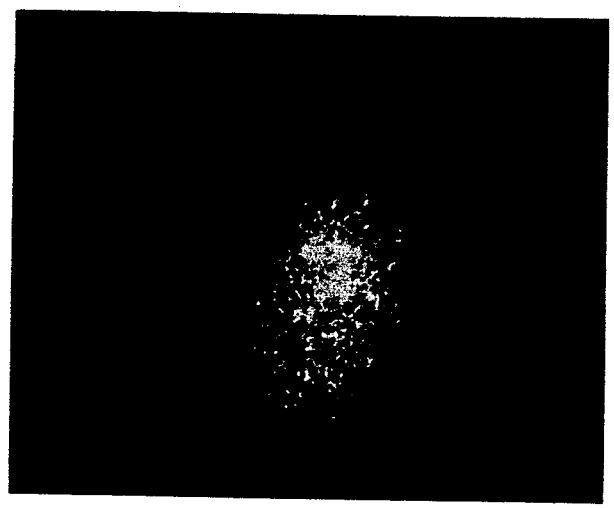

In connection with FIG. 7 the same hologram was used as in FIG. 3, but the reconstruction was performed with a plane wave. Slightly visible and defocused real and virtual images can be ascertained to the right and the left of the reconstruction wave.

Figure 8:
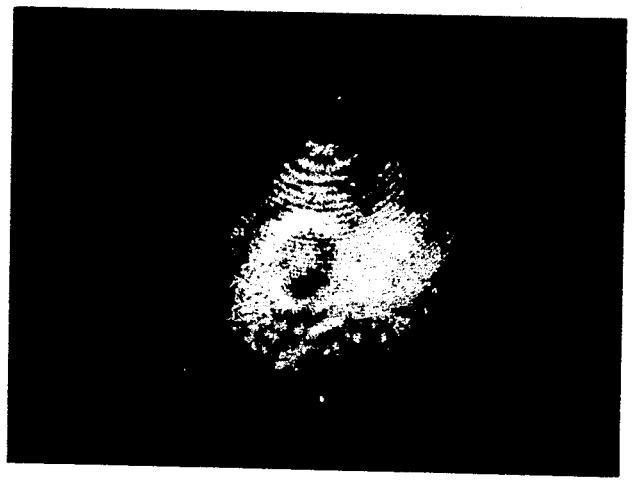
FIG. 8 shows simultaneous reconstructions by means of two different holograms.

The reconstruction in FIG. 8 was obtained by enlarging the laser beam by means of a collimator, such that both 3 and 5 cm holograms were illuminated at the same time. It can be seen that the images coming from the two holograms are of different order because of their relative positions to the corresponding holograms.

Figure 9:
FIGS. 9-10 show two different reconstructions of one and the same object.

FIG. 9 shows the reconstruction of a more complicated object that consists of a number of object points which together form the number 3. The hologram was produced with the focal point at a distance of 3 cm from the hologram plane while its x- and y-coordinates were the same as the center point of the hologram.

Figure 10:
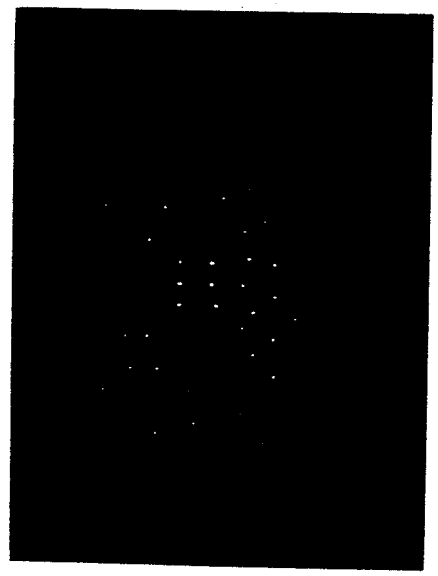

FIG. 10 shows the reconstruction of the same object as in FIG. 9, but focused at a distance farther from the hologram by adjusting the focal point. Thus it proved to be easy to control the size of the image by a very small adjustment of the position of the focal point.

It is previously known that various object wavefronts can be encoded on the same hologram. Although the experiments included herein do not concern reconstruction of such a hologram, it will be understood from the above that such a process obviously is of the same nature as in these experiments since various order images can be considered to be wavefronts of different objects. However, it is to be noted that such a hologram is produced with the spherical reference wave source in different positions, one for each object wavefront. The reconstruction is performed with the source in corresponding positions in order to focus each wavefront at a time at the desired position. In addition to obtaining one image at a time, the problem of different order images is also simultaneously taken care of.

As already mentioned, the holograms were produced by the method described in U.S. Pat. No. 4,109,996. Briefly, this method concerns consideration of each hologram point in relation to the phase and amplitude of for the object point at $(x_o, y_o, z_o)$ and for a reference/reconstruction wave with direction cosines, $\alpha$, $\beta$, $\gamma$ as well as for the wavelength $\lambda$, the equation is also valid for an object point at $(x_o', y_o', z_o')$ and for a wave with direction cosines $\alpha'$, $\beta'$, $\gamma'$ as well as for the wavelength $\lambda'$, such that $$z_o' = \frac{\lambda}{\lambda'} \frac{z_o}{m} \tag{29}$$

$$x_o' = \frac{\lambda}{\lambda'} \left[ \frac{\alpha' - m\alpha}{m} z_o + x_o \right] \tag{30}$$

$$y_o' = \frac{\lambda}{\lambda'} \left[ \frac{\beta' - m\beta}{m} z_o + y_o \right] \tag{31}$$

where m is an integer and represents various orders. m=1 corresponds to the real image, m=−1 the virtual image and m=0 the zero-order wave, i.e. a plane wave propagating in the same direction as the original reference wave. Other values of m represent higher order images.

Likewise it is seen that if equation (27) is valid for the object point at $(x_o, y_o, z_o)$ and for a reference/reconstruction wave with focal point at $(x_c, y_c, z_c)$ and with wavelength $\lambda$, the equation is as well valid for the object point at $(x_o', y_o', z_o')$ and for a reference/reconstruction wave with focal point at $(x_c', y_c', z_c')$ and with wavelength $\lambda'$, such that $$\frac{1}{z_o'} = \frac{\lambda}{\lambda'} m \left( \frac{1}{z_o} + \frac{1}{z_c} \right) - \frac{1}{z_c'} \tag{32}$$

$$x_o' = z_o' \left[ \frac{\lambda}{\lambda'} m \left( \frac{x_o}{z_o} + \frac{x_c}{z_c} \right) - \frac{x_c'}{z_c'} \right] \tag{33}$$

$$y_o' = z_o' \left[ \frac{\lambda}{\lambda'} m \left( \frac{y_o}{z_o} + \frac{y_c}{z_c} \right) - \frac{y_c'}{z_c'} \right] \tag{34}$$

where m is an integer. It is noted that m=0 corresponds to a wave that is the same as the reference/reconstruction wave and which is focused at the focal point. If $z_o \gg z_c$, and if it is assumed that the coordinates $(x_c, y_c, z_c)$ are the same as the coordinates $(x_c', y_c', z_c')$, the positions of the images, with the exception of the position when m=1, is given by $$z_o' \approx \frac{z_c}{m-1} \tag{35}$$

$$x_o' \approx x_c + m z_o' x_o / z_o \tag{36}$$

$$y_o' \approx y_c + m z_o' y_o / z_o \tag{37}$$

In other words, if the focal point of the optical system is placed sufficiently close to the hologram, all reconstructed images except the one for m=1, must be located so close to the hologram that they become completely defocused in that distance from the hologram where the desired image is.

However, the experiments revealed that it is possible to focus one order image at a time. If the mth order image is desired at the position $(x_o', y_o', z_o')$, the corresponding values for $(x_c', y_c', z_c')$ can quite easily be found such that the equations (32), (33) and (34) are satisfied, whereby all the other images become completely defocused and out of sight in that distance from the hologram where the desired image is, because they should have been located very close to the hologram. Thus, theory and experiments indicate the same results.

The analysis shows that those images which correspond to other orders than the one desired, are forced to positions close to the hologram as long as the paraxial approximation is valid. The paraxial approximation is, however, not valid very close to the hologram. Accordingly, well defined image points cannot be expected close to the hologram. Additionally, the methods in digital holography for encoding the hologram points are valid for object points which are at a reasonable distance from the hologram, and do not function well close to the hologram, especially due to the registration errors of the hologram apertures and their size. Thus, it is possible that the hologram functions as a special kind of filter that filters out or reduces the intensity of the undesired images in addition to the defocusing effect mentioned previously.

These arguments can be supported by considering what happens when $z_c' \to \infty$ in equations (32), (33) and (34), in other words when a plane wave is used for reconstruction. Again assuming that $z_o \gg z_c$ and that $\lambda = \lambda'$, the following equations are obtained:

$$z_o' \approx \frac{z_c}{m} \tag{38}$$

$$x_o' \approx \frac{z_c}{z_o} x_o + x_c \tag{39}$$

$$y_o' \approx \frac{z_c}{z_o} y_o + y_c \tag{40}$$

These equations indicate that the images must be focused close to the hologram. Any absence of visible images indicate that the above conclusions are valid.

Further it is interesting to see, by means of the equations, what happens to the positions of the higher order images when $z_c$ becomes smaller. From equation (32) it is found, for equal wavelengths, that $$z_o' \approx \frac{z_z z_c'}{m z_c' - z_c} \tag{41}$$

Thus, when m increases, $z_o'$ approaches $z_c/m$. This means that it becomes more difficult to observe higher order images when the hologram is produced closer to the focal point of the spherical reference wave. Equation (41) thus confirms the experimental results. Additionally, this equation shows that the focusing distance $z_o'$ can easily be adjusted by varying the position of the focal point of the spherical reconstruction wave.

In the following it is to be shown that the invention is valid for other encoding techniques, as well. If the object is considered as a collection of N point sources, the object wave $U(x_i, y_i)$ will be given by $$U(x_i, y_i) = \sum_{l=1}^{N} A_l e^{jk(r_{li} + r_{ci})} \tag{42}$$

A given encoding technique must specify what each $r_{li} + r_{ci}$ should be. For example:

$$r_{li} + r_{ci} = n\lambda + s_{li} \tag{43}$$

where n is an integer. Then one tries to find new values $r_{li}'$ and $r_{ci}'$ provided that $s_{li}$ remains the same fraction of the wavelength, and n is replaced by nm where m is another integer. In the general case this is always possible for $m=\pm 1$.

It can be shown that the third and fourth terms in equation (2) also satisfy the conditions given with regard to equation (43) for $m=\pm 1$. Thus, the method is also valid for analog holography.

A tolerance factor around $s_{li}$ of $\pm\lambda/4$ can be accepted as this does not change the analysis. Then all the conclusions derived previously should also be valid in the general case when $m=\pm 1$. However, some techniques may be more prone to errors caused by the area of the hologram points and inaccuracies in their positioning because of such tolerance factor.

Because of the time limitations involved in calculating the sampled wavefront, it is often necessary to use the fast Fourier transform (FFT) in digital holography. This means that the object is periodic with a period being the area designed for the object. Since both the real and virtual images have their higher order images, it becomes rather cumbersome to eliminate the problem of non-overlapping images. By the present invention, which automatically results in only one visible image at a time, this problem is avoided. In this respect, however, it will be noted that only half of the images can be removed by the present invention, because the FFT causes the periodicity of the object, whereas the encoding technique is responsible for generating various orders.

I claim:

1. A method for the production of a hologram of at least one object wavefront and reconstruction of the same by means of a spherical reference/reconstruction wave, said method comprising:
    locating a point source of the reference/reconstruction wave a very short distance from the hologram;
    slightly adjusting said distance during the reconstruction process, whereby only one reconstructed image selected from a group consisting of a real image, a virtual image, images of different order of the same object, and images of different objects is focused with said source in a given position close to said hologram, while the other images are simultaneously defocused by being located very close to said hologram; and
    determining said distance on the basis of the signal to noise ratio desired at the image position, geometrical dimensions which per se are known to cause defocusing, such as hologram size, distance between the hologram and the object, and the area of hologram apertures.

2. A method as claimed in claim 1, comprising adjusting said distance during the reconstruction process until said one reconstructed image is brought away from focus and another image is focused.

3. A method as claimed in claim 1, wherein said hologram contains information of more than one wavefront, and further comprising moving the source of the reference wave to another position each time another wavefront is to be encoded on said hologram, and said images correspond to the different reconstructed wavefronts.

* * * * *